United States Patent [19]

Kolasinski et al.

[11] Patent Number: 5,556,502
[45] Date of Patent: Sep. 17, 1996

[54] OPTICAL FIBER CABLE CHEMICAL STRIPPING FIXTURE

[75] Inventors: John R. Kolasinski, Greenbelt; Alexander M. Coleman, Brandywine, both of Md.

[73] Assignee: The United States of America as represented by the Adminstrator of the National Aeronautics and Space Administration, Washington, D.C.

[21] Appl. No.: 428,598

[22] Filed: Apr. 25, 1995

Related U.S. Application Data

[62] Division of Ser. No. 254,360, May 31, 1994, Pat. No. 5,451,294.

[51] Int. Cl.$^6$ .................................................. B44C 1/22
[52] U.S. Cl. ............................................ 165/345; 216/24
[58] Field of Search .................................. 165/344, 345; 216/24, 91, 97

[56] References Cited

U.S. PATENT DOCUMENTS

| | | | |
|---|---|---|---|
| 2,968,056 | 1/1961 | Aveni | 156/345 X |
| 3,332,757 | 7/1967 | Hawkins | 156/655 X |
| 3,885,071 | 5/1975 | Blad et al. | 156/630 X |
| 5,100,507 | 3/1992 | Cholewa et al. | 156/663 X |

*Primary Examiner*—William Powell
*Attorney, Agent, or Firm*—Keith L. Dixon

[57] ABSTRACT

An elongated fixture handle member is connected to a fixture body member with both members having interconnecting longitudinal central axial bores for the passage of an optical cable therethrough. The axial bore of the fixture body member, however, terminates in a shoulder stop for the outer end of a jacket of the optical cable covering both an optical fiber and a coating therefor, with an axial bore of reduced diameter continuing from the shoulder stop forward for a predetermined desired length to the outer end of the fixture body member. A subsequent insertion of the fixture body member including the above optical fiber elements into a chemical stripping solution results in a softening of the exposed external coating thereat which permits easy removal thereof from the optical fiber while leaving a desired length coated fiber intact within the fixture body member.

10 Claims, 1 Drawing Sheet

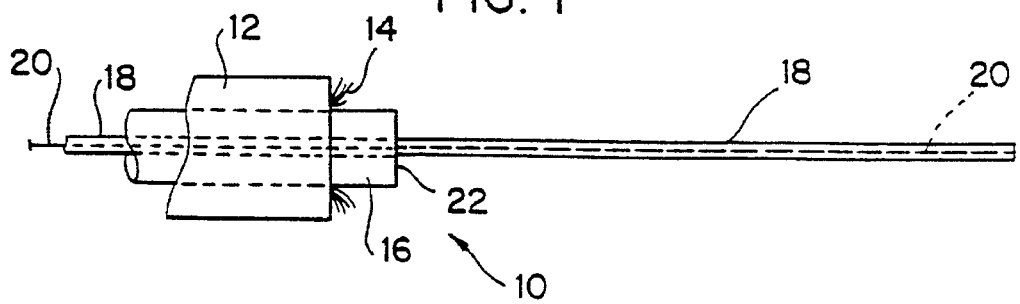
FIG. 1
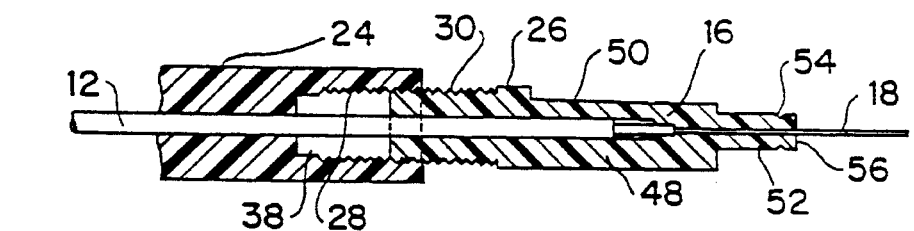
FIG. 2
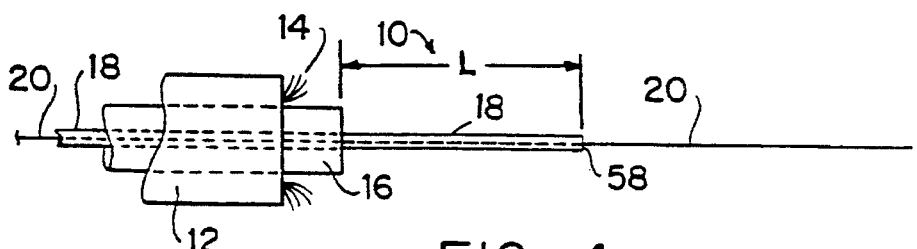
FIG. 3
FIG. 4

5,556,502

1

OPTICAL FIBER CABLE CHEMICAL STRIPPING FIXTURE

This application is a divisional of application Ser. No. 08/254,360, filed on May 31, 1994, now U.S. Pat. No. 5,451,294, the entire contents of which are hereby incorporated by reference.

ORIGIN OF THE INVENTION

The invention described herein was made by employees of the United States Government, and may be manufactured and used by or for the Government for Governmental purposes without the payment of any royalties thereon or therefor.

FIELD OF THE INVENTION

This invention relates generally to a method and apparatus for stripping an optical fiber cable and, more particularly, to a method and apparatus for chemically removing the coating surrounding glass fibers in optical fiber cables.

BACKGROUND OF THE INVENTION

Heretofore, when the coating needed to be removed from the optical fiber of an optical fiber cable so that it can be terminated with a connector assembly or terminals, it typically involved using electrical wire stripping techniques or the fiber was simply dipped and withdrawn from a chemical stripping solution by hand.

Mechanical fiber coating removal techniques, however, can nick, scratch, score or otherwise damage extremely small and fragile optical fibers. Such damage is difficult to detect and can result in a latent defect in the cable which is unacceptable in high reliability applications. Hand held chemical removal techniques also do not provide the control necessary to strip the fiber coating to precise lengths, and generally do not produce sharp, well defined edges or interfaces between the optical fiber and the fiber coating.

SUMMARY

It is an object of the present invention, therefore, to provide an improvement in the removal of coatings from optical fiber.

It is a further object of the invention to improve the chemical removal of coating which surround glass fibers used in optical fiber cables.

It is another object of the invention to provide increasing reliability of the chemical removal of optical fiber coatings so that substantially flawless optical fiber surfaces are provided.

It is still a further object of the invention to provide fiber coating removal of an optical fiber cable to precise dimensions so that the cable can be more efficiently terminated with a connector assembly.

The foregoing and other objects of the invention are provided by an elongated fixture handle member connected to a fixture body member, both members having interconnecting longitudinal central axial bores for the passage of an optical cable therethrough, the axial bore of the fixture body member, however, terminates in a shoulder stop for the outer end of the inner jacket of the optical cable covering both an optical fiber and a coating therefor, with an axial bore of reduced diameter continuing from the shoulder stop forward for a predetermined desired length to the outer end of the fixture body member, whereby a subsequent insertion of the fixture body member into a chemical stripping solution results in a softening of the exposed external coating thereat which permits easy removal thereof from the optical fiber while leaving a desired length of coated fiber within the fixture body member intact.

BRIEF DESCRIPTION OF THE DRAWINGS

The following detailed description of the invention will be more readily understood when considered in conjunction with the accompanying drawings, wherein:

FIG. 1 is a side elevational view of an end section of an optical fiber cable ready for chemical stripping of the fiber coating from the end of an optical fiber;

FIG. 2 is an exploded elevational view of three variations of the preferred embodiment of the subject invention;

FIG. 3 is a central longitudinal cross sectional view of one fixture body shown in FIG. 2 attached to a fixture handle member; and FIG. 4 is a side elevational view of the optical fiber cable shown in FIG. 1 with a portion of the fiber coating stripped from the optical fiber.

DETAILED DESCRIPTION OF THE INVENTION

Referring now to the drawings and more particularly to FIG. 1, shown thereat is an end portion of an optical fiber cable 10 which is comprised of an outer jacket 12 within which there is an intermediate cloth-like member 14 and an inner jacket 16 which in turn covers a coating 18, covering an optical conductive fiber 20, typically consisting of glass. The coating 18 is typically comprised of a well known material such as acrylate.

Before the optical fiber cable 10 can be terminated with a connector assembly or terminals, however, a certain portion of the coating 18 must be removed or stripped from the glass fiber 20. Moreover, depending upon the type of termination required, an exposed length L of fiber coating 18 must remain intact, such that it projects from the outer end 22 of the inner jacket 16, with the exposed glass fiber 20 then being severed at an appropriate length, leaving a structure such as shown in FIG. 4.

To accomplish this result and where the length L is variable and yet controlled so as to have a very precise dimension, a chemical stripping fixture, shown in FIG. 2, comprised of two elements fabricated from an inert material, such as tetrafluoroethylene (TFE), a fixture handle member 24 and a fixture body member 26, are coupled together with the end of the optical fiber cable 10 to be stripped inserted therein as shown in FIG. 3. The handle member 24 is shown connectable to one of three different fixture body members 26-1, 26-2 and 26-3 by being screwed together by mating threads 28 and 30, respectively.

As further shown in FIG. 2, the fixture handle member 24 comprises an elongated member which is generally cylindrical in cross section and which is typically three inches long and 0.5 inches in diameter. The handle member 24 includes an external flat portion 32 for gripping and marking and a longitudinal central axial bore 34 which includes a fluted outer end 36. The inner end of the axial bore 34 terminates in a threaded inner end portion 38 of relatively larger diameter and which includes female type threads 28.

Each of the fixture body member 26-1, 26-2 and 26-3 are substantially identical in construction with the exception that three different bore lengths $L_1$, $L_2$ and $L_3$ are implemented by respective central longitudinal axial bores 40 having a relatively smaller diameter to accommodate a glass fiber 20 and its associated fiber coating 18 (FIG. 1). At the inner end of the bores 40, there is located a relatively larger shoulder portion 42 which is dimensioned to receive the forward end 22 of the inner jacket 16, also shown in FIG. 1. The rear ends of the fixture body members 26-1 . . . 26-3 include a set of male type threads 30 and a relatively larger longitudinal axial bore 44 whose diameter substantially matches that of the bore 34 in the handle member 24. The fixture body members 26-1 . . . 26-3 each include an intermediate body portion 48 and have a flat gripping and marking surface 50 at the front thereof. A reduced diameter tip portion 52 extends from the intermediate body portion 48. The tip portion 52 includes a peripheral notch 54 a predetermined distance back from the end face 56 and acts as an immersion line for the operation now to be explained.

When an optical fiber cable 10 is ready for removal of the fiber coating 18, the cable is first inserted into a disassembled stripping fixture, as shown in FIG. 2, comprised of the handle member 24 and one of the fixture body members 26-1, 26-2, 26-3, where it is seated into the fixture body member 26-1, for example, such that the end surface 22 (FIG. 1) of the inner jacket 16 abuts the shoulder 42. Once the cable 10 is seated properly, the coated optical fiber 20 and the fiber coating 18 to be stripped therefrom protrudes from the tip portion 52. The fixture handle member 24 is screwed onto the fixture body 26-1 and the cable assembly is picked up via the fixture handle member 24. The protruding fiber 20 and its fiber coating 18 is immersed into an appropriate chemical stripping solution up to the notch 54 encircling the tip portion 52. The immersed fiber elements are held in the stripping solution until the fiber coating 18 softens, which is typically about 90 seconds. At this point, the fiber coating 18 is removed up to the front end face 56 of the tip portion 52, by sliding the fixture body member 26-1 off the cable 10 or by wiping the softened coating 18 off using a cloth, leaving a length L of fiber coating 18 within the fixture body member which when removed therefrom provides a structure such as shown in FIG. 4.

The fixture body members 26-1, 26-2 and 26-3 ensure that optical fibers are stripped to a precisely controlled lengths $L_1$, $L_2$ and $L_3$, respectively, typically within 0.010 inches and that the remaining fiber coating 18 has a sharp well defined interface 58 as shown in FIG. 4.

The stripping fixture according to the subject invention, when used with chemical stripping solutions, eliminates the possibility of nicking, scratching or otherwise damaging the extremely fragile optical fibers during fiber coating stripping operations. The fixture body member together with the chemical stripping agent reduces the possibility of latent defects in the cable in high reliability applications. Both the handle member and the fixture body member are fabricated from inert materials so that the fixture assembly is not damaged or affected by contact with most chemical stripping solutions used to remove optical fiber coatings.

Having thus shown and described what is at present considered to be the preferred embodiment of the invention, it should be noted that the same has been made by way of illustration and not limitations. Accordingly, all modifications, alterations and changes coming within the spirit and scope of the invention as set forth in the appended claims are herein meant to be included.

We claim:

1. Apparatus for chemically stripping a portion of a coating covering an optical fiber of an optical fiber cable, comprising:

a fixture including a chemically inert handle member connectable to a chemically inert fixture body member for holding an end portion of an optical fiber cable, said optical fiber cable being comprised of an optical fiber, a coating covering the optical fiber, and at least one outer jacket coveting both the coating and the optical fiber, and said fixture body member further comprising an elongated inert body member having a forward central longitudinal axial bore and having a diameter for passing said exposed length of optical fiber, said coating, and said at least one outer jacket to an outer end thereof, whereby when a portion of said coating extends beyond the forward bore and it is immersed in a coating stripping solution, the coating extending beyond the forward bore is softened for removal from said optical fiber while leaving a coating intact within the fixture body member.

2. The apparatus according to claim 1 wherein said fixture body member includes a shoulder in a diameter transition region between said forward and rear bores for receiving a forward end of said outer jacket.

3. The apparatus according to claim 2 wherein said optical fiber cable is comprised of another outer jacket covering said at least one outer jacket and wherein said rear bore has a diameter for passing said optical fiber coils with said another outer jacket.

4. The apparatus according to claim 2 wherein said optical fiber cable is comprised of another outer jacket covering said at least one outer and a strength member therebetween and wherein said rear bore has a diameter for passing said optical fiber cable with said another outer jacket and said strength member.

5. The apparatus according to claim 1 wherein said fixture body member includes a relatively smaller dimensioned outer tip portion, and wherein said forward axial bore passes through said tip portion.

6. The apparatus according to claim 4 wherein said outer tip portion includes means for indicating a desired immersion depth for said fixture body member in said coating stripping solution.

7. The apparatus according to claim 5 wherein said means for indicating comprises a peripheral notch located on said outer tip portion.

8. The apparatus according to claim 6 wherein said handle member comprises an elongated member including a central longitudinal axial bore having a diameter at least equal to the rear axial bore of said rear central longitudinal bore of said fixture body member.

9. The apparatus according to claim 8 wherein said handle member and fixture body member are connectable by respective sets of screw threads located on respective forward and rear portions thereof.

10. The apparatus according to claim 1 wherein said fixture includes a plurality of fixture body members having respectively different lengths of forward central longitudinal axial bores.

\* \* \* \* \*